(12) United States Patent
Murari et al.

(10) Patent No.: US 11,223,179 B1
(45) Date of Patent: Jan. 11, 2022

(54) MULTI-MILLIJOULE HOLMIUM LASER SYSTEM

(71) Applicant: University of Central Florida Research Foundation, Inc., Orlando, FL (US)

(72) Inventors: Krishna Murari, Orlando, FL (US); Yanchun Yin, Orlando, FL (US); Fangjie Zhou, Orlando, FL (US); Yi Wu, Orlando, FL (US); Zenghu Chang, Orlando, FL (US)

(73) Assignee: University of Central Florida Research Foundation, Inc., Orlando, FL (US)

(*) Notice: Subject to any disclaimer, the term of this patent is extended or adjusted under 35 U.S.C. 154(b) by 249 days.

(21) Appl. No.: 16/687,333

(22) Filed: Nov. 18, 2019

Related U.S. Application Data

(60) Provisional application No. 62/768,643, filed on Nov. 16, 2018.

(51) Int. Cl.
*H01S 3/23* (2006.01)
*H01S 3/00* (2006.01)
*H01S 3/094* (2006.01)
*H01S 3/16* (2006.01)

(52) U.S. Cl.
CPC .......... *H01S 3/0057* (2013.01); *H01S 3/0085* (2013.01); *H01S 3/0092* (2013.01); *H01S 3/094076* (2013.01); *H01S 3/161* (2013.01); *H01S 3/2308* (2013.01); *H01S 3/2333* (2013.01)

(58) Field of Classification Search
CPC ............. H01S 3/0057; H01S 3/0092; H01S 3/094076; H01S 3/161; H01S 3/2308; H01S 3/2333
See application file for complete search history.

(56) References Cited

PUBLICATIONS

A. Dergachev, "High-energy, kHz-rate, picosecond, 2-μm laser pump source for mid-IR nonlinear optical devices," Proc. SPIE 8599, 85990B (2013).
A. Dergachev, "45-dB, Compact, Single-Frequency, 2-μm Amplifier," Fiber Laser Applications, OSA Technical Digest CD) (Optical Society of America, 2012), paper FTh4A.2.
L. Von Grafenstein et al., "Picosecond 34 mJ pulses at kHz repetition rates from a Ho:YLF amplifier at 2μm wavelength," Opt. Exp , 23, 33142 (2015).
K. Murari et al., "Intracavity gain shaping in millijoule-level, high gain Ho:YLF regenerative amplifiers," Opt. Lett. 41, 1114(2016).

(Continued)

*Primary Examiner* — Michael Carter
(74) *Attorney, Agent, or Firm* — Suiter Swantz pc llo

(57) ABSTRACT

A laser system may include a seed laser formed from a Ti:Sapphire laser providing pulsed light and an optical parametric amplifier to generate pulsed light within a Holmium emission spectrum as seed pulses in response to the pulsed light from the Ti:Sapphire laser. A laser system may further include an amplifier to generate amplified pulses of light in response to the seed pulses from the seed laser, where the amplified pulses include at least some of the seed pulses amplified by the one or more Holmium-doped gain media pumped by the one or more pump lasers. The amplifier may include one or more Holmium-doped gain media and one or more pump lasers providing continuous-wave pump light within an absorption spectrum of the one or more Holmium-doped gain media.

29 Claims, 6 Drawing Sheets

(56) References Cited

PUBLICATIONS

Ml. Hemmer et al., "2-mm wavelength, high energy Ho:YLF chirped pulse amplifier for mid-infrared OPCPA," Opt. Lett. 10,451 (2015).
P. Kroetz et al., "Overcoming bifurcation instability in high-repetition-rate Ho:YLF regenerative amplifiers," Opt. Lett. 23, 5427 (2016).
K. Murari et al., "Multi-millijoule Ho:YLF based amplifier for pumping mid-infrared OPCPA at 1 kHz," in Frontiers in Optics + Laser Science APS/DLS, OSA Technical Digest (Optical Society of America, 2019), paper JW4A.34, 2 pages.

MULTI-MILLIJOULE HOLMIUM LASER SYSTEM

CROSS-REFERENCE TO RELATED APPLICATION

The present application claims the benefit under 35 U.S.C. § 119(e) of U.S. Provisional Application Ser. No. 62/768,643, filed Nov. 16, 2018, entitled MULTI-MILLI-JOULE HOLMIUM LASER SYSTEM, naming Krishna Murari, Yanchun Yin, and Zenghu Chang as inventors, which is incorporated herein by reference in the entirety.

GOVERNMENT LICENSE RIGHTS

This invention was made with Government support under contracts FA9550-17-1-0499, FA9550-16-1-0013, and FA9550-15-1-0037 awarded by the U.S. Air Force Office of Scientific Research (AFOSR), contracts W911NF-19-1-0224 and W911NF-14-1-0383 awarded by the Army Research Office (ARO), contract HR0011834427 awarded by the Defense Advanced Research Projects Agency (DARPA), and contract 1806575 awarded by the National Science Foundation (NSF). The government has certain rights in the invention.

TECHNICAL FIELD

The present disclosure relates generally to ultrafast laser systems and, more particularly, to solid-state laser systems providing pulses with multi-millijoule pulse energy centered around 2.05 microns.

BACKGROUND

Ultrashort laser pulses having pulse durations on the order of femtoseconds and spectra centered around 2.05 microns (µm) are highly desirable for a wide range of applications including spectroscopy, sensing, LIDAR, medical, materials processing, military, and eye-safe applications. Further, ultrashort laser pulses centered around 2.05 µm exhibiting high stability and high pulse energies may be utilized as pump sources for additional laser systems providing pulses centered around longer infrared (IR) wavelengths such as mid-infrared (MIR) or far-infrared (FIR) wavelengths. For example, wavelengths between approximately 3 µm and 12 µm may be suitable for biological sensing applications commonly referred to as a "molecular fingerprint" spectral window since absorption lines of many biological materials lie in this spectral window. By way of another example, long-wavelength pulses are suitable for the generation of high-harmonics across a wide bandwidth for the production of coherent extreme ultraviolet (XUV) light as well as attosecond laser pulses.

Ultrafast laser systems typically include an oscillator to generate seed pulses and one or more amplification stages to generate pulses with desired pulse energies. However, oscillator systems generally provide pulses with pulse energies on the order of nanojoules such that substantial amplification is required to reach pulse energies useful for many applications (e.g., millijoules or higher). Chirped pulse amplification (CPA) is a widely used technique that facilitates significant amplification by reducing peak power of pulses during amplification by introducing chirp prior to amplification and recompressing the pulses after amplification. However, the shortest achievable pulse durations are limited in high-gain CPA systems by the gain bandwidth of the gain medium as well as gain narrowing in which central wavelengths of pulses are amplified more than wavelengths on the wings. Advances in optical parametric amplification (OPA) technology, which supports amplification of spectral components outside the gain bandwidth of the gain medium, have enabled the generation of high-energy laser pulses with ever-shorter pulse durations (e.g., pulse durations on the order of attoseconds), particularly when combined with CPA techniques.

Amplification of broadband pulses in OPA technology is typically based on a frequency-mixing process in a nonlinear medium that is pumped by a high-energy narrowband pulse and a difference frequency pulse. The extent of the amplification of the spectral components and generation of new frequency components rely largely on the nonlinear medium used in this process.

Typical OPA systems for generating ultrashort pulses employ an oxide-based nonlinear medium such as barium borate (BBO) and utilize well-developed Ti:Sapphire technology having a gain bandwidth centered approximately around 800 nm to pump the nonlinear medium. However, the transmission properties of the oxide-based non-linear medium may limit spectral components in the MIR or FIR spectral regions. Hence a non-oxide medium such as zinc germanium phosphide (ZGP) is typically used as the non-linear medium in the OPA system. However, due to nonlinear properties such as two-photon process, it cannot be pumped by the commercial Ti:Sapphire technology. One solution is to pump this non-oxide medium with pulses having longer wavelengths such as those generated through Holmium emission (e.g., centered around approximately 2.05 µm). However, laser systems providing pulses centered around 2.05 µm typically suffer from low stability, low pulse energy, and/or undesirably long pulses (e.g., tens of picoseconds). As a result, the practical ability to utilize ultrashort laser pulses centered around 2.05 µm directly or as seed pulses in more complex systems is practically limited. It is therefore desirable to provide systems and methods for generating ultrashort laser pulses that cure the above deficiencies.

SUMMARY

A laser system is disclosed in accordance with one or more illustrative embodiments of the present disclosure. In one illustrative embodiment, the system includes a seed laser. In another illustrative embodiment, the seed laser includes a Ti:Sapphire laser providing pulsed light. In another illustrative embodiment, the seed laser includes an optical parametric amplifier (OPA), where the OPA generates pulsed light within a Holmium emission spectrum as seed pulses in response to the pulsed light from the Ti:Sapphire laser. In another illustrative embodiment, the system includes an amplifier to generate amplified pulses of light corresponding to the seed pulses from the seed laser. In another illustrative embodiment, the amplifier includes one or more Holmium-doped gain media. In another illustrative embodiment, the amplifier includes one or more pump lasers providing continuous-wave pump light within an absorption spectrum of the one or more Holmium-doped gain media, wherein the amplified pulses include at least some of the seed pulses amplified by the one or more Holmium-doped gain media pumped by the one or more pump lasers.

A laser system is disclosed in accordance with one or more illustrative embodiments of the present disclosure. In one illustrative embodiment, the system includes a seed laser. In another illustrative embodiment, the seed laser includes a Ti:Sapphire laser to generate pulsed light. In another illustrative embodiment, the seed laser includes a first OPA, where the first OPA generates pulsed light within a Holmium emission spectrum as seed pulses based on the pulsed light from the Ti:Sapphire laser. In another illustrative embodiment, the system includes an amplifier to generate amplified pulses corresponding to the seed pulses from the seed laser. In another illustrative embodiment, the amplifier includes one or more Holmium-doped gain media. In another illustrative embodiment, the amplifier includes one or more pump lasers providing continuous-wave pump light within an absorption spectrum of the one or more Holmium-doped gain media, where the seed pulses are amplified by the one or more Holmium-doped gain media pumped by the one or more pump lasers. In another illustrative embodiment, the system includes a second optical parametric amplifier, where the second optical parametric amplifier generates pulsed light having wavelengths larger than the wavelengths of the amplified pulses based on the amplified pulses.

A method is disclosed in accordance with one or more illustrative embodiments of the present disclosure. In one illustrative embodiment, the method includes generating seed pulses with a seed laser. In another illustrative embodiment, the seed laser includes a Ti:Sapphire laser providing pulsed light. In another illustrative embodiment, the seed laser includes an optical parametric amplifier, where the optical parametric amplifier generates pulsed light within a Holmium emission spectrum as seed pulses in response to the pulsed light from the Ti:Sapphire laser. In another illustrative embodiment, the method includes amplifying the seed pulses with an amplifier. In another illustrative embodiment, the amplifier includes one or more Holmium-doped gain media. In another illustrative embodiment, the amplifier includes one or more pump lasers providing continuous-wave pump light within an absorption spectrum of the one or more Holmium-doped gain media.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures.

DETAILED DESCRIPTION

Figure 1:
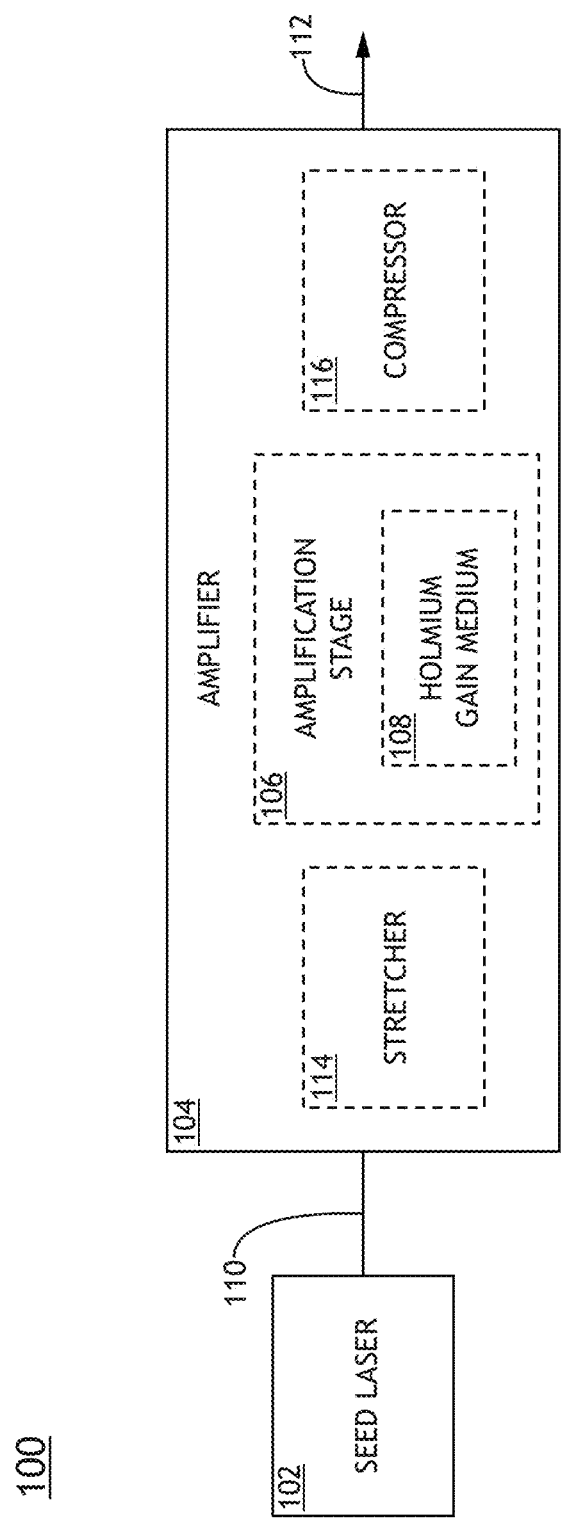
FIG. 1 is a conceptual view of a Holmium laser system, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to systems and methods for generating stable ultrashort pulses centered at approximately 2.05 μm having multi-millijoule pulse energies at a 1 kHz repetition rate. In some embodiments, a Holmium laser system includes a seed laser formed from a Ti:Sapphire laser coupled to an optical parametric amplifier (OPA) to generate seed pulses centered at 2.05 μm with relatively low energy. The Holmium laser system may further include one or more amplification stages to amplify the seed pulses to selected pulse energies. For example, a Ti:Sapphire-based seed laser including an OPA may generate a stable train of pulses centered around 2.05 μm with pulse energies on the order of microjoules or greater, which may be amplified by one or more amplification stages including Holmium-doped gain media to generate amplified pulses on the order of millijoules or greater. In some embodiments, the amplified pulses have pulse energies greater than 50 μJ.

It is recognized herein that properties of amplified pulses generated by an amplified laser system may depend on an interplay between the seed laser and any amplification stages. For example, the temporal stability (e.g., jitter, or the like) of the output laser pulses may be limited by the temporal stability of the seed laser. By way of another example, the amount of gain required in amplification stages to provide amplified pulses with desired pulse energies typically impacts both the system complexity and properties of the amplified pulses such as, but not limited to, the pulse duration or the spectrum.

In general, the amount of gain experienced by a seed pulse in a single pass through a gain medium in an amplification stage may be limited by a variety of factors including, but not limited to, the length of the gain medium, doping concentration, the quality of mode-matching between the seed pulse and pump light in the gain medium, the damage threshold of the gain medium, or thermal effects within the gain medium (e.g., thermal lensing, or the like). Amplifiers may thus incorporate a variety of techniques to provide a desired amount of gain. For example, amplifiers may pass seed pulses through a gain medium multiple times (e.g., in a regenerative or a multi-pass geometry) and/or pass seed pulses through multiple gain media (e.g., multiple amplification stages) to provide amplified pulses with a desired pulse energy. By way of another example, amplifiers may utilize chirped-pulse amplification (CPA) techniques to increase the amount of gain in one or more amplification stages. In this regard, a seed pulse may be temporally stretched (e.g., chirped) prior to amplification and compressed after amplification to reduce the peak power of the pulse during amplification, which may mitigate non-linear effects and damage to optical components.

However, high levels of gain may negatively impact the properties of the amplified pulses and/or introduce undesirable system complexities that may negatively impact system performance or reliability. In this regard, it may be desirable to minimize the amount of gain in one or more amplification stages to the extent possible or practical. For example, increasing the length of the gain medium (e.g., a crystal length in a solid-state system) may increase the amount of gain that may be generated in a single pass. However, optical nonlinearities associated with propagation of pulses through the gain medium (e.g., as described by the B-integral) may lead to nonlinear phase shifts and chirp mismatch between stretcher and compressor stages of an amplifier (e.g., in a CPA system), which may increase the pulse duration of an amplified pulse relative to an input seed pulse. These optical nonlinearities may scale with the length of the gain medium and may thus practically limit the length of the gain medium suitable for generating amplified pulses within desired tolerances (e.g., desired pulse durations). By way of another example, increasing the number of passes through a gain medium or the number of amplification stages may increase the complexity of the system, which may lead to tight alignment tolerances and/or instabilities (e.g., bifurcation instabilities) that may negatively impact system performance.

Gain narrowing, a process in which central wavelengths of a seed pulse experience higher gain than wavelengths in the wings, may additionally limit the gain bandwidth and thus increase the pulse duration of an amplified pulse relative to an input seed pulse. Gain narrowing generally scales with the amount of gain and may thus provide an additional practical limitation on the amount of gain a seed pulse may undergo while maintaining desired pulse characteristics.

It is further recognized herein that commercial as well as custom Ti:Sapphire laser systems (e.g., oscillators and/or amplifiers) may provide a stable source of ultrashort pulses centered around 800 nm with highly-controlled temporal and pulse energy stability. OPA systems utilizing input pulses generated from Ti:Sapphire systems may similarly provide a stable source of ultrashort pulses with tunable wavelengths. Accordingly, a Ti:Sapphire laser system coupled to an OPA tuned to provide ultrashort laser pulses centered at 2.05 μm is well-suited to operate as a seed laser for a Holmium laser system.

In some embodiments, a seed laser for a Holmium laser system includes an amplified Ti:Sapphire laser system coupled with an OPA to provide ultrashort seed pulses centered at 2.05 μm having pulse energies. Such seed pulses may have pulse energies on the order of microjoules or greater. For example, an amplified Ti:Sapphire laser system may reliably provide ultrashort pulses (e.g., pulse durations on the order of femtoseconds) centered at 800 nm having millijoule pulse energies. Further, an OPA may convert these 800 nm pulses to 2.05 μm pulses with microjoule pulse energies. In this regard, a Holmium laser system with a Ti:Sapphire-based seed laser coupled to an OPA to generate high-energy 2.05 μm seed pulses (e.g., seed pulses having microjoule pulse energies) may limit the amount of gain of the 2.05 μm seed pulses required to reach a desired pulse energy and may thus limit the negative effects of high gain at 2.05 μm (e.g., gain narrowing, system complexity).

Accordingly, a Holmium laser system incorporating a seed laser including an amplified Ti:Sapphire laser system coupled to an OPA as described herein may provide higher amplified pulse energies, shorter amplified pulse durations, and/or more stable performance than a system incorporating a seed laser including an oscillator to directly provide seed pulses centered at 2.05 μm. For example, oscillators are typically limited to providing pulse energies on the order of nanojoules, which necessitates greater amplification than a Ti:Sapphire-based seed laser as described herein and suffers from the limitations described above. It is further recognized herein that oscillator technology for directly generating pulses around 2.05 μm is generally not as well-developed as Ti:Sapphire technology and may not provide comparable levels of temporal and/or pulse energy stability, which may negatively impact the performance of the complete amplified system. Holmium laser systems based on oscillator seed lasers are generally described in A. Dergachev, "High-energy, kHz-rate, picosecond, 2-μm laser pump source for mid-IR nonlinear optical devices," Proc. SPIE 8599, 85990B (2013); A. Dergachev, "45-dB, Compact, Single-Frequency, 2-μm Amplifier," Fiber Laser Applications, OSA Technical Digest (CD) (Optical Society of America, 2012), paper FTh4A.2; L. Von Grafenstein et al., "Picosecond 34 mJ pulses at kHz repetition rates from a Ho:YLF amplifier at 2 μm wavelength," Opt. Exp., 23, 33142 (2015); K. Murari et al., "Intracavity gain shaping in millijoule-level, high gain Ho:YLF regenerative amplifiers," Opt. Lett. 41, 1114 (2016); M. Hemmer et al., "2-μm wavelength, high energy Ho:YLF chirped pulse amplifier for mid-infrared OPCPA," Opt. Lett. 40, 451 (2015); P. Kroetz et al., "Overcoming bifurcation instability in high-repetition-rate Ho:YLF regenerative amplifiers," Opt. Lett. 23, 5427 (2016); and K. Murari et al., "Multi-millijoule Ho:YLF based amplifier for pumping mid-infrared OPCPA at 1 kHz," in Frontiers in Optics+Laser Science APS/DLS, OSA Technical Digest (Optical Society of America, 2019), paper JW4A.34, all of which are incorporated herein by reference in their entirety.

An amplification stage of a Holmium laser system as described herein may amplify the 2.05 μm pulses using any technique known in the art including, but not limited to chirped pulse amplification. In some embodiments, a Holmium laser system includes one or more components (e.g., gratings, prisms, or the like) to stretch the 2.05 μm pulses prior to amplification and compress the 2.05 μm pulses after amplification. For example, an amplification stage of a Holmium laser system may include one or more chirped volume Bragg gratings (CVBGs) for providing a required amount of chirp for stretching and compressing the pulses. In this regard, one or more amplification stages of a Holmium laser system configured in accordance with the present disclosure may include CVBGs to provide chirped-pulse amplification with a small footprint. Further, the CVBGs may be utilized at normal incidence through the use of a thin-film polarizer and a quarter-waveplate, which may reduce thermal effects and astigmatism induced by the CVBGs and may thus avoid ellipticity of the beam.

Additional embodiments of the present disclosure are directed to colinear amplification and efficient extraction of amplified pulses using a thin-film polarizer in combination with a Faraday rotator and a half-waveplate.

Additional embodiments of the present disclosure are directed to efficient pumping of Holmium amplifier stages with linearly polarized (e.g., p-polarized) pump light. For example, emission from a pump source (e.g., a Thulium laser source) may be split into two orthogonal polarizations, which may be used to pump seed pulses traveling in forward and backward directions through the Holmium gain medium, respectively. Further, efficient pumping may optimize the amount of pump light used at each amplification stage to enable a single pump laser to pump multiple amplification stages, which may increase overall system efficiency while reducing system complexity, cost, and footprint size.

Further embodiments of the present disclosure are directed to an OPA providing ultrashort laser pulses with tunable wavelengths in the MIR or FIR spectral ranges that are pumped by a Holmium laser system configured in accordance with the present disclosure. For example, an OPA based on non-oxide crystals such as, but not limited to, zinc germanium phosphide (ZGP) or orientation-patterned gallium arsenide (OP-GaAs), may be pumped by a Holmium laser system configured in accordance with the present disclosure. It is recognized herein that the output spectrum of an OPA may be limited by nonlinear processes. For instance, the output spectrum of an OPA pumped directly by 800 nm pulses (e.g., from a Ti:Sapphire laser system) may be limited to approximately 4 µm due to two-photon absorption and low conversion efficiency. In this regard, pumping an OPA with 2.05 µm pulses with a Holmium laser system configured in accordance with the present disclosure may facilitate the generation of high-energy, ultrashort pulses in the MIR or FIR spectral ranges such as, but not limited to, 3 µm to 12 µm. In this regard, the OPA may be suitable for applications such as, but not limited to, sensing in the MIR or FIR spectral ranges, the generating of coherent XUV light, or generating attosecond laser pulses via high-harmonic generation.

Referring now to FIGS. 1 through 4, a Holmium laser system 100 seeded with a Ti:Sapphire-based seed laser and pumped with a continuous-wave Thulium laser is described in greater detail.

FIG. 1 is a conceptual view of a Holmium laser system 100, in accordance with one or more embodiments of the present disclosure. In one embodiment, the Holmium laser system 100 includes a seed laser 102 and an amplifier 104 including at least one amplification stage 106 having a Holmium gain medium 108. For example, the seed laser 102 may generate pulsed laser light in the form of seed pulses 110 that may be amplified by the amplifier 104 into amplified pulses 112. Further, the seed pulses 110 may have wavelengths within an emission spectrum (e.g., a gain bandwidth) of Holmium such that the seed pulses 110 may be amplified by the Holmium gain medium 108 within the amplifier 104. For instance, the seed pulses 110 may have a bandwidth centered around approximately 2.05 µm.

The amplifier 104 may include any type of amplifier known in the art. In one embodiment, the amplifier 104 includes a chirped-pulse amplifier (CPA). For example, the amplifier 104 may include a stretcher 114 to introduce chirp into the seed pulses 110 prior to amplification by at least one amplification stage 106 and a compressor 116 to at least partially remove chirp from the amplified seed pulses 110. For example, the stretcher 114 may increase the pulse duration of seed pulses to a value of, but not limited to, approximately 490 ps. The amplified pulses 112 may thus correspond to the compressed seed pulses 110 from the compressor 116. The stretcher 114 and the compressor 116 may include any type of dispersive optics known in the art such as, but not limited to, diffraction gratings or prisms. Further, the stretcher 114 and the compressor 116 may be formed as separate optical components or as a single optical component (e.g., in which chirped seed pulses 110 are reflected back onto the single optical component after amplification). In one embodiment, the stretcher 114 and/or the compressor 116 are formed from chirped volume Bragg gratings (CVBGs). It is recognized herein that CVBGs may facilitate a small system footprint.

The Holmium gain medium 108 may include any gain medium known in the art such as, but not limited to, a Holmium-doped crystal. In one embodiment, the Holmium gain medium 108 includes a Ho:YLF crystal. In another embodiment, the Holmium gain medium 108 includes a Ho:YAG crystal.

Figure 2:
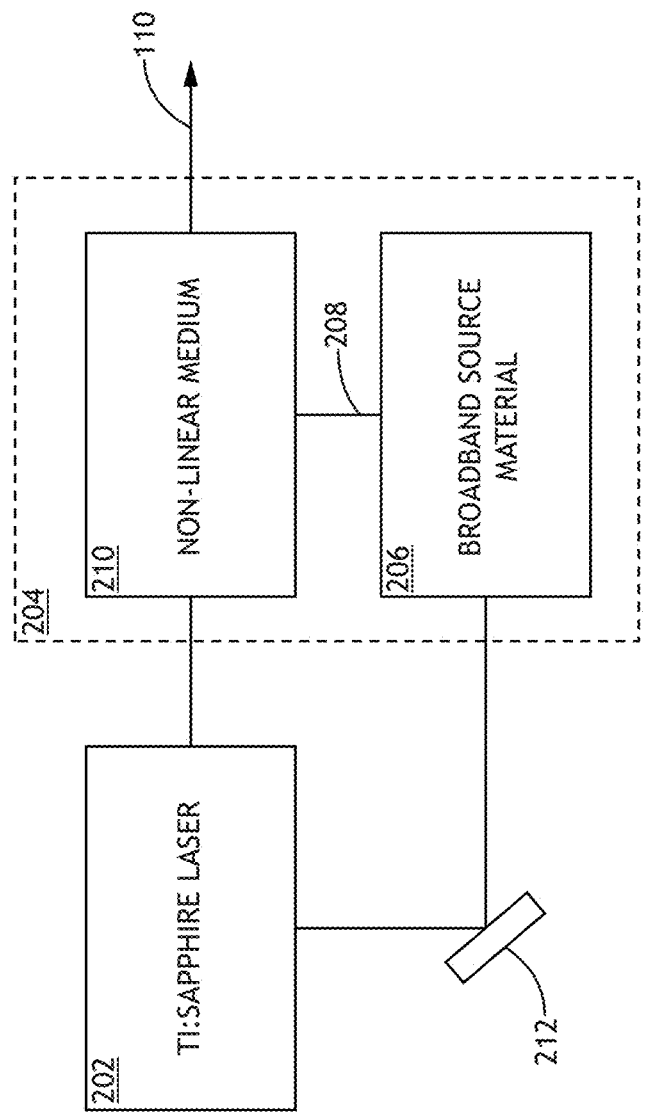
FIG. 2 is a conceptual view of a seed laser for the Holmium laser system, in accordance with one or more embodiments of the present disclosure.

FIG. 2 is a conceptual view of a seed laser 102 for the Holmium laser system 100, in accordance with one or more embodiments of the present disclosure.

In one embodiment, the seed laser 102 includes a Ti:Sapphire laser 202 suitable for generating ultrashort laser pulses, and a seed OPA 204. For example, the Ti:Sapphire laser 202 may generate ultrashort laser pulses with pulse durations on the order of femtoseconds with wavelengths within the gain bandwidth of Ti:Sapphire, which may be, but is not required to be, centered around approximately 800 nm. The seed OPA 204 may then convert the pulses from the Ti:Sapphire laser 202 to pulses within an emission spectrum of the Holmium gain medium 108 which may be, but is not required to be, centered around 2.05 µm.

The Ti:Sapphire laser 202 may include any type of laser based on a Ti:Sapphire gain medium and may provide seed pulses 110 at any selected repetition rate such as, but not limited to, 1 kHz. In one embodiment, the Ti:Sapphire laser 202 is an oscillator configured to directly generate the seed pulses 110. In another embodiment, the Ti:Sapphire laser 202 is an amplified system (e.g., a Ti:Sapphire oscillator coupled with an amplifier). In this regard, the Ti:Sapphire laser 202 may generate the seed pulses 110 with any selected pulse energy. For example, the Ti:Sapphire laser 202 may generate, but is not required to generate, seed pulses 110 having pulse energies of at least 1 mJ. Further, the Ti:Sapphire laser 202 may include a commercial Ti:Sapphire laser system or a custom Ti:Sapphire system. In one embodiment, the Ti:Sapphire laser 202 includes a custom 14-pass CPA Ti:Sapphire amplifier emitting 1 mJ pulse energy and 30 fs duration centered at 800 nm.

The seed OPA 204 may include any type of OPA system known in the art such as, but not limited to, a dual-chirped OPA (DC-OPA) system. As illustrated in FIG. 2, the seed OPA 204 may include a broadband source material 206 to generate broadband light 208 and a nonlinear medium 210 to support nonlinear mixing of the broadband light 208 with pulses from the Ti:Sapphire laser 202. For example, the seed OPA 204 may include a beamsplitter 212 to split light from the Ti:Sapphire laser 202 along two paths, where light along the first path is directed to the broadband source material 206 for generation of the broadband light 208 and light along the second path is directed to the nonlinear medium 210. The broadband source material 206 may include any material suitable for generating broadband spectral components from the pulses from the Ti:Sapphire laser 202 such as, but not limited to, a sapphire plate or a photonic crystal fiber. In one embodiment, the broadband source material 206 includes a 3 mm thick sapphire plate. The nonlinear medium 210 may include any type of nonlinear material suitable for supporting 2.05 µm light. For example, the nonlinear medium 210 may include a nonlinear crystal such as, but not limited to, barium borate (BBC)). In addition, though not shown, the OPA 204 may include any number of turning mirrors or other optical components such as, but not limited to, lenses, polarizers, filters, or the like suitable for adjusting one or more characteristics of light within the OPA 204.

In one embodiment, the various components of the seed laser 102 are selected and arranged to balance the chip between the broadband light 208 and the portion of the light from the Ti:Sapphire laser 202 directed to the nonlinear medium 210. In this regard, both the broadband light 208 and the pulses from the Ti:Sapphire laser 202 accumulate an equal amount of chirp (e.g., positive chirp) when passing through the respective bulk material. Further, when the broadband light 208 and the pulses from the Ti:Sapphire laser 202 have an equal amount of chirp, phase-matching may occur in the nonlinear medium 210 such that the frequency difference between all the phase-matched portions of the broadband light 208 and the pulses from the Ti:Sapphire laser 202 are constant (or at least substantially constant within a tolerance). As a result, a single narrow-wavelength idler beam may be generated. For example, the broadband light 208 may be generated by focusing light from the Ti:Sapphire laser 202 into the broadband light generator 206 including a 3 mm thick sapphire plate, and seed pulses 110 centered around 2.05 μm may be generated in the nonlinear medium 210 from difference frequency generation (DFG) in a BBO crystal utilizing a dual-chirped optical parametric amplification technique (DC-OPA), where the thickness of the BBO crystal is selected based on the thickness of the sapphire plate to provide phase matching. Further, the pulse energies of the seed pulses 110 may be determined by the energy of the Ti:Sapphire laser 202 as well as the efficiency of the seed OPA 204. For example, a Ti:Sapphire laser 202 generating pulses with approximately 1 mJ pulse energy may provide, but is not required to provide, sufficient energy for the generation of seed pulses 110 with approximately 30 μJ.

Figure 3:
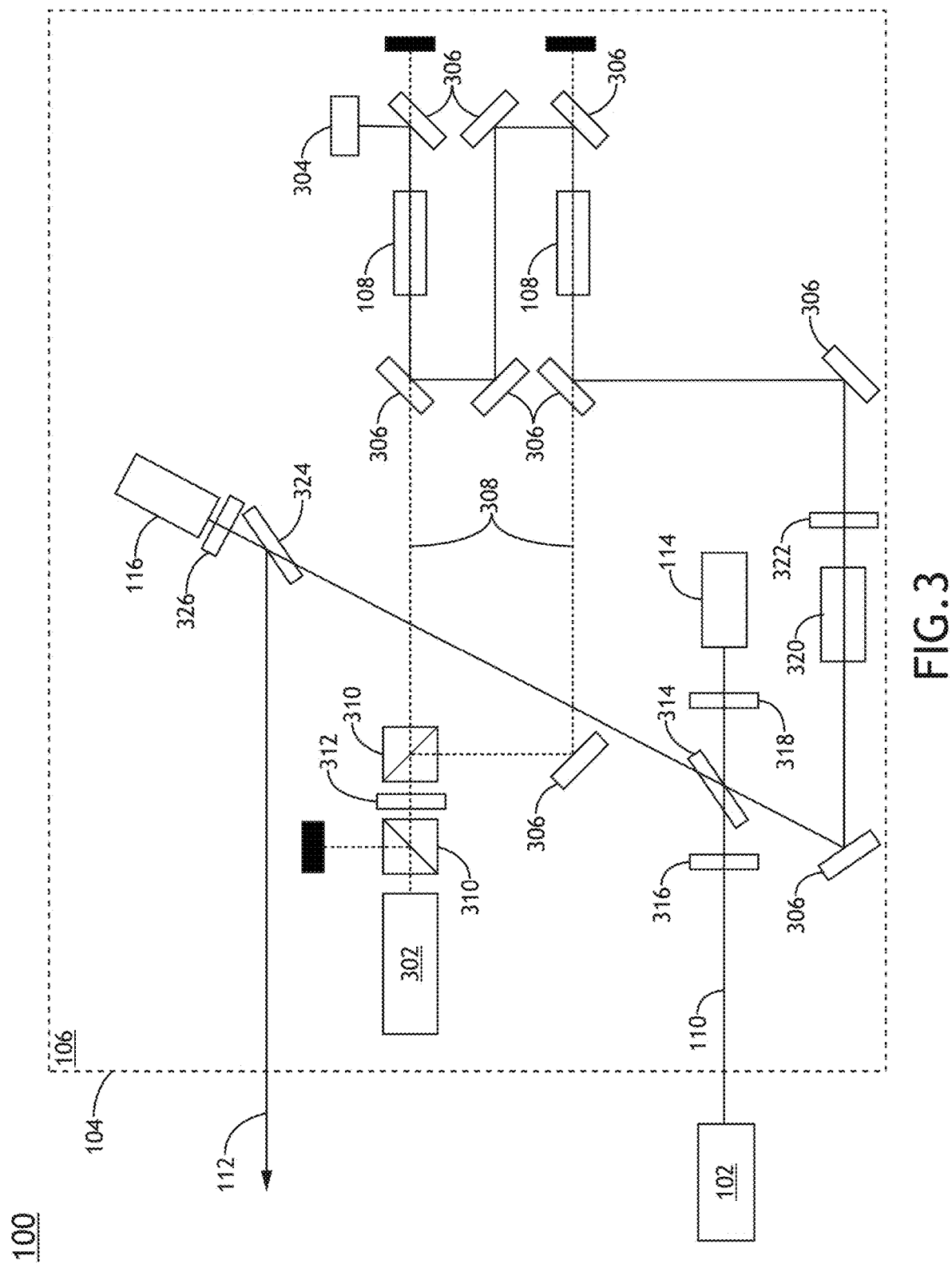
FIG. 3 is a conceptual view of a Holmium laser system illustrating a layout of an amplifier, in accordance with one or more embodiments of the present disclosure.

FIG. 3 is a conceptual view of a Holmium laser system 100 illustrating a layout of an amplifier 104 (e.g., a Holmium amplifier), in accordance with one or more embodiments of the present disclosure. In one embodiment, the seed pulses 110 are temporally stretched in a stretcher 114 and directed to at least one Holmium gain medium 108 pumped by at least one pump laser 302 and then compressed by a compressor 116 to provide a train of amplified pulses 112.

As described previously herein, a Holmium gain medium 108 may include any type of Holmium-doped gain medium such as, but not limited to, a Ho:YLF crystal or a Ho:YAG crystal. In one embodiment, at least one Holmium gain medium 108 includes a cylindrical rod-shaped Ho:YLF crystal. Further, the Holmium gain medium 108 may be cooled by any technique known in the art such as, but not limited to, a water-cooled indium-contacted copper thermal management system in contact with the Holmium gain medium 108.

The amplifier 104 may include any number of Holmium gain media 108 in any number of amplification stages 106 (e.g., the single amplification stage 106 in FIG. 3, or the like). Further, the amplifier 104 may pass the seed pulses 110 through any of the amplification stages 106 any number of times. In one embodiment, as illustrated in FIG. 3, the amplifier 104 includes a dual-stage 4-pass amplifier. In this regard, the seed pulses 110 from the stretcher 114 are directed through two Holmium gain media 108, reflected by a mirror 304, and directed back through the two Holmium gain media 108 before reaching the compressor 116. For example, the mirror 304 may be selected to have a radius of curvature to facilitate mode-matching of the seed pulses 110 and the pump light 308 in the Holmium gain media 108. The amplifier 104 may additionally include any number of turning mirrors 306 as well as other optical components not shown (e.g., lenses, polarizers, filters, or the like) to direct and/or shape the various beams through the amplifier 104 (e.g., to facilitate mode-matching of the seed pulses 110 and the pump light 308 in the Holmium gain media 108, to adjust beam sizes to avoid damage, or the like).

The amplifier 104 may include any number of pump lasers 302 of any type to generate pump light 308 suitable for pumping a Holmium gain medium 108. In one embodiment, a pump laser 302 includes a Thulium laser such as, but not limited to, a Thulium fiber laser, generating continuous-wave light within an absorption spectrum of the Holmium gain medium 108. For example, a Thulium laser may generate light at approximately 1.94 μm, which corresponds to an absorption peak of a Ho:YLF crystal. A pump laser 302 may further generate pump light at any power. For example, a commercially-available Thulium laser may generate at least 120 W of pump light 308.

In one embodiment, the crystal axis of a crystalline Holmium gain medium 108 is designed for the maximum absorption and emission of p-polarized light. Accordingly, pump light 308 may be split into two-orthogonal polarizations (e.g., with polarizing beamsplitters 310, or the like). In this regard, the output power of a pump laser 302, which may be more than enough to pump a single Holmium gain medium 108, may be split into multiple arms. Further, the polarization of the pump light 308 may be adjusted (e.g., via half-waveplates 312) to provide p-polarization pumping of the Holmium gain medium 108. In this regard, a single high-powered pump laser 302 may efficiently pump multiple Holmium gain media 108.

It may be the case that the pulse energy of amplified pulses 112 (e.g., amplified seed pulses 110) may be limited by damage thresholds on one or more components of the amplifier 104 such as, but not limited to, the faces of crystalline Holmium gain media 108. In one embodiment, a crystalline Holmium gain medium 108 includes one or more coatings on one or more faces to facilitate efficient transmission of the seed pulses 110 and/or the pump light 308 to mitigate damage. For example, in one embodiment, a dual-stage 4-pass amplifier 104 (e.g., as illustrated in FIG. 3) pumped with 20 W of pump light 308 in each stage may provide amplified pulses 112 of approximately 6 mJ, which may be limited by damage to the faces of the crystalline Holmium gain media 108. Accordingly, improvements to coating technology may further increase the available pulse energy of the amplified pulses 112 (e.g., up to 30 mJ or higher).

The seed pulses 110 may be injected into and extracted from the amplifier 104 using any technique known in the art. In one embodiment, the amplifier 104 includes a polarizer 314 (e.g., a thin-film polarizer) sufficiently large to facilitate four-way operation. For example, as illustrated in FIG. 3, the input polarization of the seed pulses 110 may be selected by an input half-waveplate 316, pass through the polarizer 314 (e.g., placed at the Brewster angle), pass through a quarter-waveplate 318, reflect from a reflective stretcher 114 (e.g., a reflective CVBG, or the like), and be reflected by the polarizer 314 as injected pulses. Further, a Faraday rotator 320 and a half-waveplate 322 may provide orthogonal polarization for injected and amplified seed pulses 110. For instance, as illustrated in FIG. 3, the polarization of the seed pulses 110 after amplification reverses relative to the polarization during injection due to the presence of the half-waveplate 322 before the Holmium gain media 108 and after the Faraday rotator 320. In this regard, the Faraday rotator 320 may rotate the polarization by +45 degrees in the forward direction and −45 degrees in the backward direction. This configuration may facilitate the propagation of the amplified seed pulses 110 through the polarizer 314 as extracted pulses, which may then be amplified through one or more additional amplification stages 106 or be compressed by the compressor 116. In another embodiment, as also illustrated in FIG. 3, the amplified pulses 112 may be directed to an additional polarizer 324 and output half-waveplate 326 to provide normal incidence of amplified seed pulses on the compressor 116.

Figure 4:
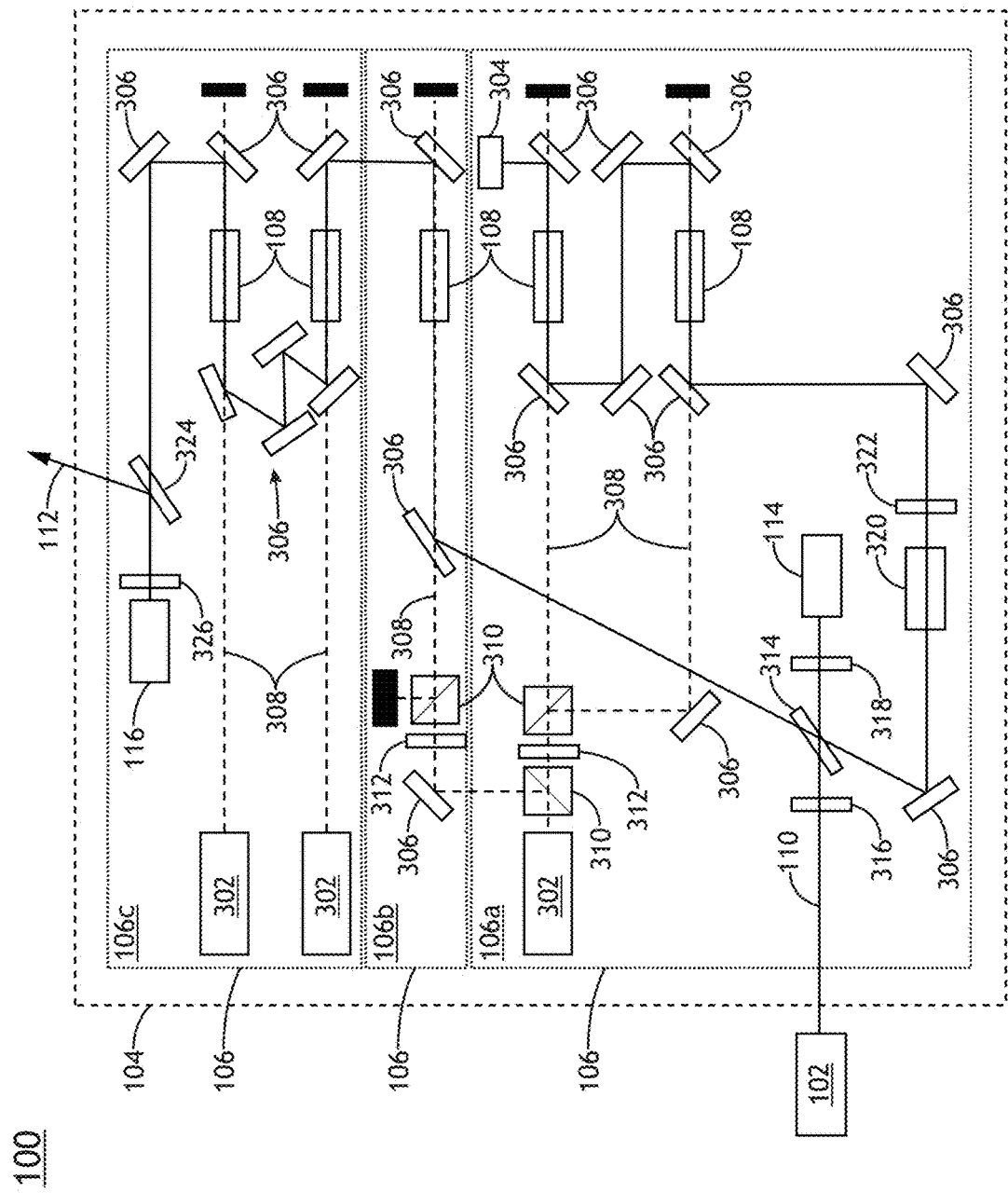
FIG. 4 is a conceptual view of a Holmium laser system including an amplifier with a primary amplification stage and two additional amplification stages, in accordance with one or more embodiments of the present disclosure.

As described previously herein, the amplifier 104 may include any number of amplification stages 106. Further, amplification stages 106 may include any combination of single-pass or multi-pass configurations. FIG. 4 is a conceptual view of a Holmium laser system 100 including an amplifier 104 with a primary amplification stage 106a and two additional amplification stages 106b-c (e.g., boost amplifiers, or the like), in accordance with one or more embodiments of the present disclosure. For example, pulses ejected from the first amplification stage 106a (e.g., from the polarizer 314) may be further amplified by single-stage, single-pass amplification stage 106b and further amplified by a multi-stage single-pass amplification stage 106c including any number of additional pump lasers 302.

It is to be understood that FIGS. 3 and 4, along with the associated descriptions, are provided solely for illustrative purposes and should not be interpreted as limiting. For example, a Holmium laser system 100 configured in accordance with the present disclosure is not limited to the physical layouts and/or the components illustrated in FIGS. 3 and 4. For instance, multiple configurations of turning mirrors 306 and placements of components such as, but not limited to, the seed laser 102, the pump lasers 302, the Holmium gain media 108 are allowable without departing from the spirit and scope of the present disclosure. Further, various components of the Holmium laser system 100 such as, but not limited to, one or more amplification stages 106, a stretcher 114, or a compressor 116 may be provided as separate sub-systems or may be integrated together either conceptually or physically. For example, the stretcher 114 and/or the compressor 116 may be considered distinct from an amplification stage 106 (e.g., as illustrated in FIG. 1) or may be integrated into one or more amplification stages 106 (e.g., as illustrated in FIGS. 3 and 4). In this regard, a stretcher 114 may be associated with a first amplification stage 106 (e.g., amplification stage 106a of FIG. 4), while the compressor 116 may be associated with an additional amplification stage 106 (e.g., amplification stage 106c of FIG. 4).

By way of another example, the Holmium laser system may include any number of pump lasers 302 arranged to pump any number of amplification stages 106 or portions thereof. Further, a pump laser 302 may be considered as a part of one or more amplification stages 106. For instance, FIG. 4 illustrates the use of a single pump laser 302 to pump two Holmium gain media 108 in amplification stage 106a as well as a Holmium gain medium 108 in amplification stage 106b. Further, FIG. 4 illustrates the use of two pump lasers 302 to pump two Holmium gain media 108 within a single amplification stage 106c. Accordingly, it is to be understood that any particular amplification stage 106 may be pumped by any number or combination of pump lasers 302.

As described previously herein, a Holmium laser system 100 as described herein may be integrated into one or more external systems. For example, the Holmium laser system 100 may be used as a light source for one or more sensing systems, imaging systems, or the like. By way of another example, the Holmium laser system 100 forms one component of a larger laser system. In this regard, amplified pulses 112 from the Holmium laser system 100 may be used as seed and/or pump pulses in another laser system. It is contemplated herein that the Holmium laser system 100 described herein may be useful as a seed and/or a pump laser for the generation of high-power IR pulses (e.g., pulses with mid-IR wavelengths, far-IR wavelengths, or the like), which may be useful for a wide range of applications including, but not limited to, sensing in the MIR or FIR spectral ranges, the generating of coherent XUV light, or generating attosecond laser pulses via high-harmonic generation.

Figure 5:
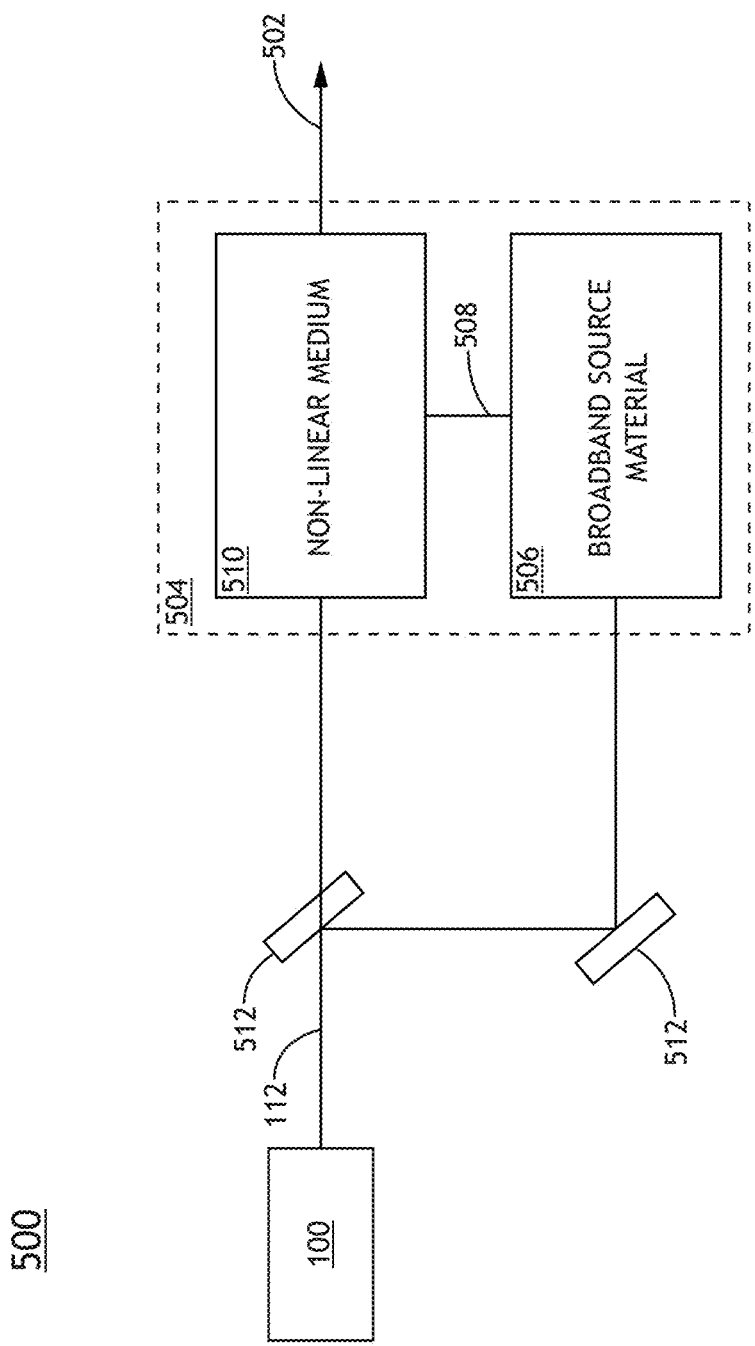
FIG. 5 is a conceptual view of a laser system for generating tunable IR pulses including the Holmium laser system and an OPA, in accordance with one or more embodiments of the present disclosure.

FIG. 5 is a conceptual view of a laser system 502 for generating tunable IR pulses 502 including the Holmium laser system 100 and an OPA 504, in accordance with one or more embodiments of the present disclosure. In one embodiment, the amplified pulses 112 of the Holmium laser system 100 are provided as inputs (e.g., pump inputs) to the OPA 504. Accordingly, output pulses 502 of the OPA 504 may have wavelengths longer than the wavelengths of the amplified pulses. For example, output pules 502 of the OPA 504 may have, but are not required to have, wavelengths that may be tuned within the range of approximately 3 μm to approximately 12 μm.

The OPA 504 may be any type of OPA known in the art suitable for providing IR output pulses 502 based on the amplified pulses 112 of the Holmium laser system 100, such as, but not limited to a dual-chirped OPA (DC-OPA) system. As illustrated in FIG. 5, the OPA 504 may include a broadband source material 506 to generate broadband light 508 and a nonlinear medium 510 to support nonlinear mixing of the broadband light 508 with the amplified pulses 112 from the Holmium laser system 100. For example, the OPA 504 may include a beamsplitter 512 to split light from the Holmium laser system 100 along two paths, where light along the first path is directed to the broadband source material 506 for generation of the broadband light 508 and light along the second path is directed to the nonlinear medium 510. The broadband source material 506 may include any material suitable for generating broadband spectral components from the pulses from the amplified pulses 112. For example, the broadband source material 506 may include an inorganic crystal transparent to the amplified pulses 112 such as, but not limited to a YAG crystal. By way of another example, the broadband source material 506 may include a photonic crystal fiber. The nonlinear medium 510 may include any type of nonlinear material suitable for supporting the wavelengths of the amplified pulses and the desired output wavelength. For example, the nonlinear medium 510 may include a nonlinear crystal such as, but not limited to, zinc germanium phosphide (ZGP) or orientation-patterned gallium arsenide (OP-GaAs). In addition, the OPA 504 may include any number of turning mirrors 514 or other optical components (not shown) such as, but not limited to, lenses, polarizers, filters, or the like suitable for adjusting one or more characteristics of light within the OPA 504.

Figure 6:
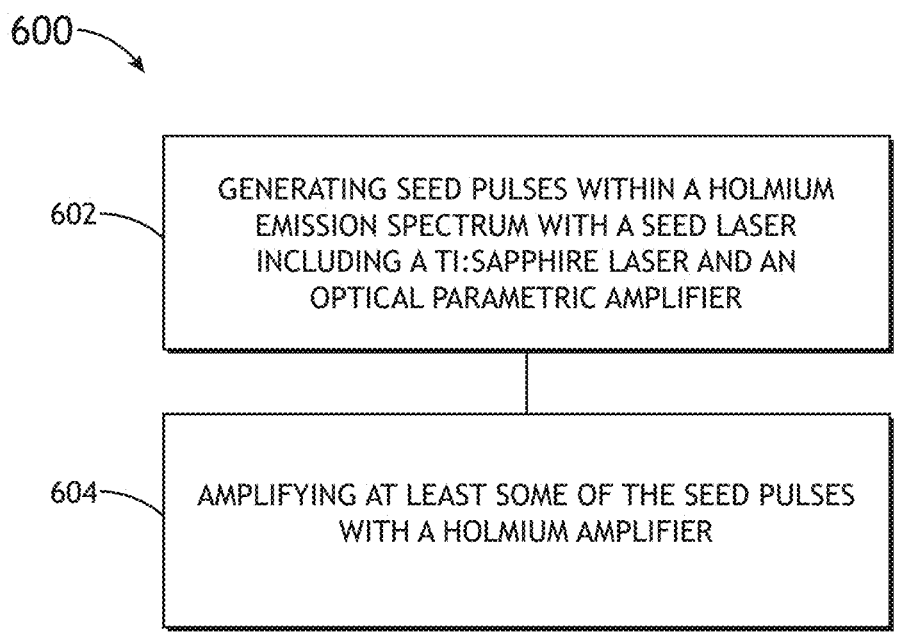
FIG. 6 is a flow diagram illustrating steps performed in a method 600 generating laser light, in accordance with one or more embodiments of the present disclosure.

FIG. 6 is a flow diagram illustrating steps performed in a method 600 generating laser light, in accordance with one or more embodiments of the present disclosure. Applicant notes that the embodiments and enabling technologies described previously herein in the context of the Holmium laser system 100 should be interpreted to extend to method 600. It is further noted, however, that the method 600 is not limited to the architecture of the Holmium laser system 100.

In one embodiment, the method 600 includes a step 602 of generating seed pulses within a Holmium emission spectrum with a seed laser including a Ti:Sapphire laser and an optical parametric amplifier. In another embodiment, the method 600 includes a step 604 of amplifying at least some of the seed pulses with a Holmium amplifier.

For example, as described within, but not limited by, the context of the Holmium laser system 100, the step 602 may include generating seed pulses within the gain bandwidth of a Holmium amplifier (e.g., an amplifier with a Holmium-doped gain medium) using a pulsed Ti:Sapphire laser coupled with an OPA. The Ti:Sapphire laser may be any type of amplified or unamplified laser system known in the art. In this regard, the output pulses of the OPA used to seed the Holmium amplifier may have relatively high pulse energies (e.g., on the order of microjoules) with a stable repetition rate provided by the Ti:Sapphire laser. Further, generating seed pulses with relatively high pulse energies limits the amount of gain by the Holmium amplifier required to provide amplified pulses with desired pulse energies. In some embodiments, though not shown, the method may further include steps of directing the amplified pulses from the Holmium amplifier to an additional system such as, but not limited to, an additional OPA for the generation of pulses having tunable wavelengths longer than the wavelengths of the amplified pulses from the Holmium amplifier.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A laser system comprising:
    a seed laser comprising:
        a Ti:Sapphire laser providing pulsed light; and
        an optical parametric amplifier, wherein the optical parametric amplifier generates pulsed light within a Holmium emission spectrum as seed pulses in response to the pulsed light from the Ti:Sapphire laser; and
    an amplifier to generate amplified pulses of light in response to the seed pulses from the seed laser, the amplifier comprising:
        one or more Holmium-doped gain media; and
        one or more pump lasers providing continuous-wave pump light within an absorption spectrum of the one or more Holmium-doped gain media, wherein the amplified pulses include at least some of the seed pulses amplified by the one or more Holmium-doped gain media pumped by the one or more pump lasers.

2. The laser system of claim 1, wherein the seed pulses from the seed laser have pulse energies of at least one microjoule.

3. The laser system of claim 2, wherein the amplified pulses from the amplifier have pulse energies of at least one millijoule.

4. The laser system of claim 2, wherein the amplified pulses from the amplifier have pulse energies of at least fifty millijoules.

5. The laser system of claim 1, wherein the amplified pulses have spectra centered at approximately 2.05 microns.

6. The laser system of claim 1, wherein the seed pulses and the amplified pulses have a repetition rate of approximately 1 kHz.

7. The laser system of claim 1, wherein the Ti:Sapphire laser comprises:
    an amplified Ti:Sapphire laser.

8. The laser system of claim 1, wherein the optical parametric amplifier comprises:
    a dual-chirped optical parametric amplifier.

9. The laser system of claim 1, wherein the optical parametric amplifier comprises:
    a beamsplitter to split the pulsed light from the Ti:Sapphire laser along a first path and a second path;
    a broadband source material to generate broadband light in response to receiving the pulsed light from the Ti:Sapphire laser from the first path; and
    a nonlinear medium, wherein the nonlinear medium generates the seed pulses in response to the broadband light and the pulsed light from the Ti:Sapphire laser from the second path.

10. The laser system of claim 9, wherein the broadband source material comprises:
    a sapphire plate.

11. The laser system of claim 9, wherein the nonlinear medium comprises:
    a beta barium borate (BBO) crystal.

12. The laser system of claim 1, wherein the amplifier comprises:
    one or more gratings to introduce chirp to the seed pulses prior to amplification by the one or more Holmium-doped gain media and at least partially remove the chirp from the seed pulses after amplification by the one or more Holmium-doped gain media.

13. The laser system of claim 1, wherein the one or more Holmium-doped gain media comprise:
    one or more Ho:YLF crystals.

14. The laser system of claim 1, wherein the one or more Holmium-doped gain media comprise:
    one or more Ho:YAG crystals.

15. The laser system of claim 1, wherein the one or more pump lasers comprise:
    one or more Thulium lasers.

16. The laser system of claim 1, wherein the amplifier comprises:
    a multi-pass amplifier, wherein the seed pulses propagate through at least one of the one or more Holmium-doped gain media two or more times before exiting the amplifier as amplified pulses.

17. The laser system of claim 1, wherein the amplifier comprises:
- a multi-stage amplifier, wherein the one or more Holmium-doped gain media comprise:
- two or more Holmium-doped gain media.

18. The laser system of claim 1, wherein the amplifier comprises:
- a two-stage four-pass amplifier, wherein the one or more Holmium-doped gain media comprises:
- two Holmium-doped gain media, wherein the seed pulses propagate through each of the two Holmium-doped gain media two times before exiting the amplifier as amplified pulses.

19. A laser system comprising:
- a seed laser comprising:
  - a Ti:Sapphire laser to generate pulsed light; and
  - a first optical parametric amplifier, wherein the first optical parametric amplifier generates pulsed light within a Holmium emission spectrum as seed pulses based on the pulsed light from the Ti:Sapphire laser;
- an amplifier to generate amplified pulses in response to the seed pulses from the seed laser, the amplification sub-system comprising:
  - one or more Holmium-doped gain media; and
  - one or more pump lasers providing continuous-wave pump light within an absorption spectrum of the one or more Holmium-doped gain media, wherein the amplified pulses include at least some of the seed pulses amplified by the one or more Holmium-doped gain media pumped by the one or more pump lasers; and
- a second optical parametric amplifier, wherein the second optical parametric amplifier generates pulsed light based on the amplified pulses, the pulsed light having longer wavelengths than the amplified pulses.

20. The laser system of claim 19, wherein the seed pulses from the seed laser have pulse energies of at least one microjoule.

21. The laser system of claim 19, wherein the amplified pulses from the amplifier have pulse energies of at least one millijoule.

22. The laser system of claim 19, wherein the amplified pulses from the amplifier have pulse energies of at least fifty millijoules.

23. The laser system of claim 19, wherein the pulsed light from the second optical parametric amplifier has a wavelength in the range of approximately 3 μm to approximately 12 μm.

24. The laser system of claim 19, wherein the first optical parametric amplifier comprises:
- a beamsplitter to split the pulsed light from the Ti:Sapphire laser along a first path and a second path;
- a broadband source material to generate broadband light in response to receiving the pulsed light from the Ti:Sapphire laser from the first path; and
- a nonlinear medium, wherein the nonlinear medium generates the seed pulses in response to the broadband light and the pulsed light from the Ti:Sapphire laser from the second path.

25. The laser system of claim 19, wherein the second optical parametric amplifier comprises:
- a beamsplitter to split the amplified pulses from the amplifier along a first path and a second path;
- a broadband source material to generate broadband light in response to receiving the amplified pulses from the first path; and
- a nonlinear medium, wherein the nonlinear medium generates the seed pulses in response to the broadband light and the amplified pulses from the second path.

26. The laser system of claim 25, wherein the nonlinear medium comprises:
- at least one of zinc germanium phosphide (ZGP) or orientation-patterned gallium arsenide (OP-GaAs).

27. A method comprising:
- generating seed pulses with a seed laser, the seed laser comprising:
  - a Ti:Sapphire laser providing pulsed light; and
  - an optical parametric amplifier, wherein the optical parametric amplifier generates pulsed light within a Holmium emission spectrum as seed pulses in response to the pulsed light from the Ti:Sapphire laser; and
- amplifying at least some of the seed pulses with an amplifier, the amplifier comprising:
  - one or more Holmium-doped gain media; and
  - one or more pump lasers providing continuous-wave pump light within an absorption spectrum of the one or more Holmium-doped gain media.

28. The method of claim 27, further comprising:
- generating pulsed light having wavelengths longer than the wavelengths of the amplified pulses with an additional optical parametric amplifier based on the amplified pulses.

29. The method of claim 27, wherein the pulsed light from the second optical parametric amplifier has a wavelength in the range of approximately 3 μm to approximately 12 μm.

* * * * *